Nov. 14, 1939.  R. SCHROEDTER  2,179,959

ELASTIC JOINT OR SUPPORT

Filed Sept. 28, 1937

Rolf Schroedter
INVENTOR

By Otto Munk
his ATTY.

Patented Nov. 14, 1939

2,179,959

UNITED STATES PATENT OFFICE 2,179,959

ELASTIC JOINT OR SUPPORT

Rolf Schroedter, Mehlem-Rhine, Germany, assignor to Leon Thiry, Huy, Belgium

Application September 28, 1937, Serial No. 166,081
In Germany November 6, 1936

7 Claims. (Cl. 287—85)

The present invention has for its object an elastic joint or support comprising a tapered member which is adapted to receive the load and which is movable, in an elastic manner, in the axial direction, with reference to a second tapered member having the same angle at the apex and serving as a support, a ring of elastic material such as rubber being mounted between the adjacent tapered faces of the two members aforesaid. In conformity with the invention, the said ring of elastic material will preferably have, in the free state, a circular cross-section. The said joint or support may be given any desired value of the relative elastic displacement between the two tapered members, either by a suitable choice of the angle at the apex of the tapered surfaces, or by giving a suitable thickness to the rubber ring, or again, by subjecting the rubber ring to a preliminary initial deformation. When the tapered member carrying the load is driven into the tapered member serves as the support, the adjacent tapered faces of the two members are brought nearer together, and the said rubber ring will roll between the two members, while at the same time it is compressed and sets up a force of reaction against the load.

In the elastic joint in conformity with the invention, the elastic ring may be located between the two tapered members without having been subjected to an initial deformation, and the joint or support may be used in this state. However, and this constitutes a particular advantage of the invention, the elastic ring may be subjected to an initial deformation, that is, it may be pressed between the two tapered members before the load is applied. It is thus possible to modify, either once for all, or in an adjustable manner, the amount of the relative elastic displacement of the two tapered members of the said joint or support.

The elastic joint or support, the subject-matter of the invention, may also have the form of a joint or support of the double-acting type. For this purpose, two members of the aforesaid construction are superposed, and this will afford on the side next the load and on the side next the support, two respective tapered faces between which rubber rings are inserted. In the same manner as for the elastic joint or support of the single-acting type, a preliminary initial deformation may be given to the rubber rings of the elastic joint or support of the double-acting type. This initial deformation may be modified by changing the distance between the tapered faces in cooperation. As compared with the joint or support of the single-acting type, the elastic joint or support of the double-acting type has the remarkable feature consisting in the fact that by modifying the initial deformation, it is possible to affect not only the degree of the elastic displacement, but also the characteristic of the damping action of the said joint or support. This property is of particular importance in all cases in which it is necessary to prevent, or to produce, a frequency of oscillation, or critical conditions of resonance.

The accompanying drawing shows by way of example, various embodiments of the invention.

Figure 1:
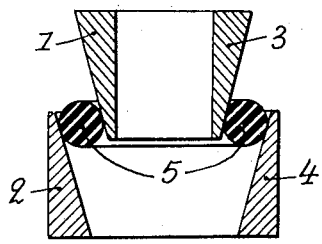
Fig. 1 is a vertical section of a joint or support without load.
Figure 2:
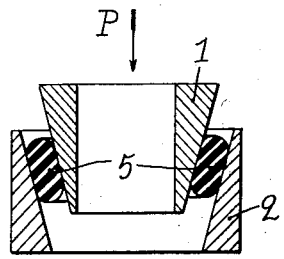
Fig. 2 is a section of the same joint or support under load.

In conformity with the invention, a rubber ring 5 having a circular cross-section is mounted between the members 1 and 2, which have respective tapered faces 3 and 4 in adjacent position. The load to be supported in an elastic manner is applied to the tapered member 1, whilst the tapered member 2 rests upon a foundation or supporting frame, or the like. If a load P is applied to the tapered member 1, the rubber ring 5 will roll between the tapered faces which are brought nearer together, and it is compressed while undergoing elastic deformation. Owing to the compression, forces having the contrary direction to that of the load will be produced, thus giving rise to the elastic action of the joint or support. It is possible to effect an initial deformation, to a given degree, of the rubber ring of the elastic joint or support of the single-acting type which is shown in Figs. 1 and 2. For this purpose, it is simply necessary to bring the tapered members 1 and 2 nearer together, before applying the load. This will modify the amount of the relative elastic displacement between the two tapered members of the joint or support.

Figure 3:
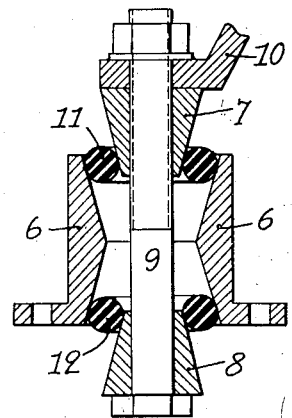
Fig. 3 is a vertical section of elastic joint or support of the double-acting type, without load.

The elastic joint or support of the double-acting type represented in Fig. 3 comprises a supporting member 6 having two internal tapered faces, and members adapted to carry the load, which are movable in the said supporting member 6 and comprise two tapered members 7 and 8. One of these tapered members, or the member 8 in the present device, is secured to a rod 9, whilst the other tapered member 7 is mounted on the said rod 9 in such manner that it can be displaced with reference to the member 8. In the device herein represented, the load, which is transmitted by means of a frame 10, is applied to the upper tapered member 7. Between the two tapered parts are mounted the respective rubber rings 11 and 12, one of which, and chiefly the ring 11, dampens the load, whilst the other, the ring 12, supports the reaction stresses in an elastic manner. In the same manner as for the single-acting joint or support, it is possible to effect an initial deformation of the rubber rings of the double-acting joint or support, i. e. the tapered members 7 and 8 may be driven into their double-tapered recess 6 in such manner that the rings 11 and 12 will have already been subjected to a certain deformation before the load is applied. This will give to the joint or support a further characteristic of damping. This latter case is represented in Fig. 4.

Figure 4:
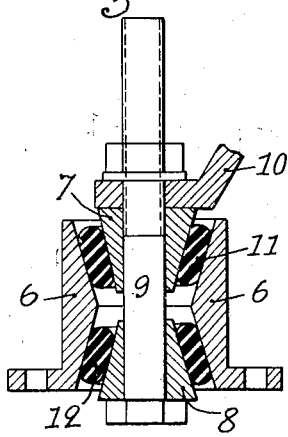
Fig. 4 is a section of the same joint or support in the case of an initial deformation.
Figure 5:
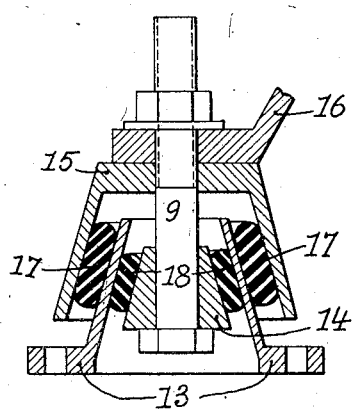
Fig. 5 shows another modification of an elastic joint or support of the double-acting type.

Fig. 5 shows another modification of an elastic joint or support of the double-acting type. The said joint or support has a less size, as to height, than the joint or support represented in Fig. 4, and this may be particularly advantageous for certain uses. In this case the internal tapered faces as well as the external tapered faces of the supporting member 13 cooperate with corresponding tapered faces of an inner tapered member 14 and of an outer tapered member 15 which is adapted to receive the load. Two elastic rings 17 and 18 are used for damping purposes, the ring 17 as concerns the load, and the ring 18 as concerns the reaction. It is further possible to employ the said joint or support by modifying the distance between the tapered faces and by using an initial deformation of the rubber rings.

In the elastic joints or supports of the double-acting type as shown in Figs. 3 to 5, it is further possible to modify the characteristics of the damping action, by the use of rubber rings having different thicknesses for damping the load and for damping the reaction.

As will be observed from the preceding considerations, the elastic joint or support in conformity with the invention can be utilized in all cases in which loads are to be applied in an elastic manner upon foundations, upon supporting frames, upon bearing surfaces, and the like, i. e., for all purposes for which use has been hitherto made of spiral or plate springs, and in general, of all types of metallic springs. On the other hand, as above indicated, the joint or support according to the invention will comply with various requirements for which the known metallic springs cannot be utilized.

Having now described my invention what I claim as new and desire to secure by Letters Patent is:

1. An elastic joint between two members subjected to efforts urging one member towards the other comprising an inner female tapered surface and an outer male tapered surface on one of said members, a male tapered element and a female tapered element connected with the other member and fitting respectively in said female surface and over said male surface of said first member, all the tapered surfaces being coaxial, and two rings of elastic material inserted respectively between the male and female elements and the corresponding female and male surfaces.

2. An elastic joint according to claim 1, in which at least one of the two tapered elements connected with said other member is adjustable in an axial direction, whereby the initial deformation of said rings may be adjusted.

3. An elastic joint according to claim 1, in which one ring has a circular cross section, the diameter of which is different, at rest, from the diameter of the cross section of the other ring.

4. An elastic joint between two members subjected to efforts urging one member towards the other comprising two pairs of coaxial tapered elements carried by said members, each pair of tapered elements comprising a male element carried by one of said members and a female element carried by the other member and having the same inclination as said male element, and said pairs of tapered elements being arranged so that the two elements of one pair are brought nearer each other when the two elements of the other pair are moved away from each other, and between the two tapered elements of each pair a ring of elastic material having when uncompressed a circular cross section, said rings being at a distance from each other and in contact exclusively with the tapered elements of the corresponding pair of elements and being adapted to roll freely in both axial directions for relative displacements between said members.

5. An elastic joint according to claim 4, in which said ring is subjected initially to a considerable deformation between said two elements.

6. An elastic joint according to claim 4, in which one ring has a circular cross-section, the diameter of which is different, at rest, from the diameter of the cross section of the other ring.

7. An elastic joint between two members subjected to efforts urging one member towards the other comprising two female coaxial tapered elements connected with one of said members, said elements having their tapered surfaces inclined in opposite directions with respect to their common axis, two male coaxial tapered elements connected with the other of said members and having the same inclinations as said female elements and the same common axis as said female elements, and two rings of elastic material having when uncompressed a circular cross section, said rings being at a distance from each other and in contact exclusively with the tapered elements of the corresponding pair of elements and being adapted to roll freely in both axial directions for relative displacements between said members.

ROLF SCHROEDTER.